United States Patent
Yamamoto et al.

(10) Patent No.: US 11,366,999 B2
(45) Date of Patent: Jun. 21, 2022

(54) INFORMATION PROCESSING DEVICE AND INFORMATION PROCESSING METHOD

(71) Applicant: Oki Electric Industry Co., Ltd., Tokyo (JP)

(72) Inventors: Kohei Yamamoto, Tokyo (JP); Kurato Maeno, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 1245 days.

(21) Appl. No.: 15/819,336

(22) Filed: Nov. 21, 2017

(65) Prior Publication Data

US 2018/0260702 A1    Sep. 13, 2018

(30) Foreign Application Priority Data

Mar. 9, 2017    (JP) .............................. JP2017-044846

(51) Int. Cl.
| | |
|---|---|
| *G06N 3/08* | (2006.01) |
| *G06N 3/04* | (2006.01) |
| *G01S 7/41* | (2006.01) |
| *G01S 13/931* | (2020.01) |
| *G01S 7/35* | (2006.01) |

(52) U.S. Cl.
CPC .............. *G06N 3/08* (2013.01); *G01S 7/417* (2013.01); *G06N 3/04* (2013.01); *G06N 3/0454* (2013.01); *G06N 3/084* (2013.01); *G01S 7/356* (2021.05); *G01S 13/931* (2013.01)

(58) Field of Classification Search
CPC .............................. G06N 3/08; G06N 3/0454
See application file for complete search history.

(56) References Cited

U.S. PATENT DOCUMENTS

| 10,067,227 B2* | 9/2018 | Kamo ..................... G01S 7/417 |
| 2016/0097853 A1 | 4/2016 | Kamo et al. | |

FOREIGN PATENT DOCUMENTS

| CN | 104811276 | * | 7/2015 | ............... H04L 1/00 |
| EP | 1387180 A1 | * | 2/2004 | ............... G01S 3/74 |
| JP | 2016-075558 A | | 5/2016 | |

OTHER PUBLICATIONS

Hirose, et al. Quaternion Neural-Network-Baed PolSAR Land Classification in Poincare-Sphere-Parameter Space, Sep. 2014, IEEE Transactions on Geoscience and Remote Sensing, vol. 52, (Year: 2014).*

(Continued)

*Primary Examiner* — Kakali Chaki
*Assistant Examiner* — Shien Ming Chou
(74) *Attorney, Agent, or Firm* — Rabin & Berdo, P.C.

(57) ABSTRACT

It is possible to improve estimation accuracy with regard to data in which significance is attached to a relative phase. Provided is an information processing device including an estimation unit configured to estimate a status by using a neural network. The neural network includes a first complex-valued neural network to which complex data is input, a phase difference computation layer from which phase difference for each element between a plurality of sets with regard to the complex data is output, and a second complex-valued neural network from which complex data is output on the basis of the phase difference.

8 Claims, 11 Drawing Sheets

(56) References Cited

OTHER PUBLICATIONS

Hansch, Complexed-Valued Convolutional Neural Networks for Object Detection in PolSAR data, 2010, EUSAR European Conference on Synthetic Aperture Radar, (Year: 2010).*

Chen et al. Correlative Filters for Convolutional Neural Netowrks, 2015, IEEE Internationa Conference on Systems, Man and Cybernetics, (Year: 2015).*

Shieh et al. Direction of Arrival Estimation Based on Phase Differences Using Neural Fuzzy Network, 2000, IEEE Transactions on Antennas and Propagation, vol. 48, (Year: 2000).*

Hirose, Quaternion Neural-Network-Based PolSAR Land Classification in Poincare-Sphere-Parameter Space, IEEE, Transactions on Geoscience and Remote Sensing vol. 52, Sep. 2014 (Year: 2014).*

Guberman, On Complex Valued Convolutional Neural Networks. Cornell University Library (arXiv) Feb. 2016 (Year: 2016).*

Goh, Nonlinear Adaptive Prediction of Complex Valued Signal by Complex-Valued PRNN, IEEE Transaction of Signal Processing vol. 53, May 2005 (Year: 2005).*

Hirose, Complex-valued Neural Networks: The Merits and Their Origins, Proceeding of International Joint Conference on Neural Network, 2009 (Year: 2009).*

Shafran, Complex-valued Linear Layers for Deep Neural Network-based Acoustic models for Speech Recognition, MERCED, University of California, 2016 (Year: 2016).*

Guberman, On Complex Valued Convolutional Neural Networks. arXiv (Year: 2016).*

Nitzan Guberman, "On Complex Valued Convolutional Neural Networks" [online] (The Hebrew University, Feb. 29, 2016) (searched on the Internet <https://arxiv.org/pdf/1602.09046.pdf> on Feb. 1, 2017).

* cited by examiner $f(z_1, z_2) = z_1 z_2^*$

INFORMATION PROCESSING DEVICE AND INFORMATION PROCESSING METHOD

CROSS REFERENCE TO RELATED APPLICATION(S)

This application is based upon and claims benefit of priority from Japanese Patent Application No. 2017-044846, filed on Mar. 9, 2017, the entire contents of which are incorporated herein by reference.

BACKGROUND

The present invention relates to information processing devices and information processing methods.

In recent years, neural networks have been focused on. The neural networks are mathematical models that simulate the cerebral nervous system. In addition, technologies of estimating various kinds of statuses by using the neural networks have been proposed. For example, JP 2016-75558A discloses a radar signal processing device that uses a neural network and estimates the number of preceding vehicles from phase differences between reception signal vectors obtained from an array antenna. In addition, Nitzan Guberman, "On Complex Valued Convolutional Neural Networks" [online] (The Hebrew University, Feb. 29, 2016) (searched on the Internet <https://arxiv.org/pdf/1602.09046.pdf> on Feb. 1, 2017) (Non-Patent Literature 1) discloses a technology of complex-valued neurons constituting a convolutional neural network (conventionally, the convolutional neural network is constituted by real-valued neurons).

SUMMARY

However, according to the technology described in JP 2016-75558A, an upper triangular matrix excluding diagonal components of an autocorrelation matrix of the reception signal vector is input to a real- or complex-valued neural network. Therefore, according to the technology described in JP 2016-75558A, it is necessary to input all possible combination pairs corresponding to the number of elements of the reception signal vector, and the size of the neural network tends to get larger.

In addition, it is difficult to treat phase difference between neurons belonging to the same layer by using the technologies described in JP 2016-75558A or Non-Patent Literature 1. Therefore, when using the technologies described in JP 2016-75558A or "Non-Patent Literature 1", estimation accuracy may be deteriorated with regard to a problem in which correlation of phases between neurons is important.

Accordingly, it is desirable to provide a novel and improved information processing device and information processing method that are capable of improving estimation accuracy with regard to data in which significance is attached to correlation of phases.

To solve the above described problem, according to an aspect of the present invention, there is provided an information processing device including an estimation unit configured to estimate a status by using a neural network. The neural network includes a first complex-valued neural network to which complex data is input, a phase difference computation layer from which phase difference for each element between a plurality of sets with regard to the complex data is output, and a second complex-valued neural network from which complex data is output on the basis of the phase difference.

The phase difference computation layer may output the phase difference on the basis of a conjugate product of corresponding elements between the sets.

The phase difference computation layer may divide complex-valued neurons belonging to a same layer into at least two or more sets, and outputs phase difference for each element between the sets.

The first complex-valued neural network may be a complex-valued convolutional neural network.

The complex-valued convolutional neural network may perform a convolution process by using a pair of convolution filters having structures different from each other.

The convolution filter may have a real-valued weight.

The neural network may further include a transformation layer configured to transform complex-valued data output from the second complex-valued neural network into real-valued data.

In addition, to solve the above described problem, according to another aspect of the present invention, there is provided an information processing method of estimating a status by using a neural network, the method including: inputting complex data; outputting phase difference for each element between a plurality of sets with regard to the complex data; and outputting complex data on the basis of the phase difference.

As described above, according to the present invention, it is possible to improve estimation accuracy with regard to data in which significance is attached to a relative phase.

DETAILED DESCRIPTION OF THE EMBODIMENT(S)

Figure 1:
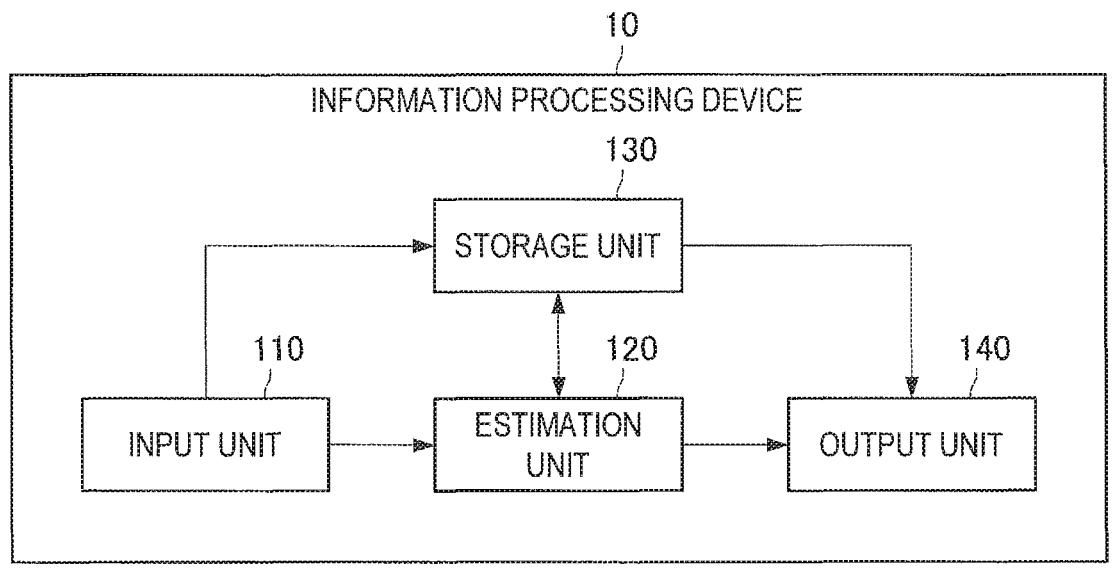
FIG. 1 is an example of a functional block diagram of an information processing device according to a first embodiment of the present invention.

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

1. BACKGROUND

In recent years, various neural network models have been proposed with development of information processing technologies. Some of the neural network models make identification on the basis of input multidimensional data such as a complex number or a quaternion that have been input.

Figure 13:
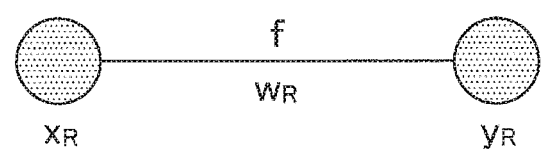
FIG. 13 is a diagram illustrating connection relation in a general real-valued neural network.

First, an overview of a general real-valued neural network and a general complex-valued neural network will be described. FIG. 13 is a diagram illustrating connection relation in the general real-valued neural network. As illustrated in FIG. 13, an input $x_R$, a weight $w_R$, and an output $y_R$ are all defined by real numbers in the real-valued neural network. Therefore, the connection relation in the real-valued neural network may be represented by the following equation (1). In FIG. 13 and the following equation (1), R represents a real number.

$$y_R = f(w_R x_R) \in R^n \quad (1)$$

Therefore, complex data cannot be directly input to the real-valued neural network, and a process to extract a real number from the complex data in advance is necessary.

Figure 14:
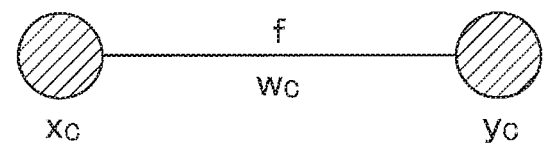
FIG. 14 is a diagram illustrating connection relation in a general complex-valued neural network.

On the other hand, FIG. 14 is a diagram illustrating connection relation in the general complex-valued neural network. As illustrated in FIG. 14, an input $x_C$, a weight $w_C$, and an output $y_C$ are all defined by complex numbers in the complex-valued neural network. Therefore, the connection relation in the complex-valued neural network may be represented by the following equation (2). In FIG. 14 and the following equation (2), C represents a complex number.

$$y_C = f(w_C x_C) \in C^n \quad (2)$$

Therefore, the complex-valued neural network is excellent in the case of a process of inputting complex data. Here, the complex data includes data in which significance is attached to the size of waves such as radio waves or acoustic waves or significance is attached to phase lead/lag, or data in which significance is attached to a specific direction such as a wind direction, for example.

However, in general, it is difficult to treat phase difference between neurons belonging to the same layer in the general complex-valued neural network. Therefore, in the general complex-valued neural network, for example, estimation accuracy is expected to be deteriorated with respect to a problem in which correlation of phases between elements is important such as estimation of an arrival direction by using reception signal vectors obtained from an array antenna.

Next, details thereof will be described. As shown in the above equation (2), inner product operation of complex numbers in the complex-valued neural network results in products of elements of the input $x_C$ and the weight $w_C$, and a sum of the products. Here, the products of complex numbers have effects of adding/subtracting phases of the respective elements to be integrated. However, the sum of complex numbers does not have such effects. Therefore, the phase becomes an average weighted with amplitude. Accordingly, it is difficult to consider correlation between neurons belonging to the same layer in the general complex-valued neural network.

The present technical ides have been made in view of the above described matters. According to the present technical idea, it is possible to calculate phase difference between neurons (in other words, pieces of complex data) belonging to the same layer in the complex-valued neural network. As one of the features, the neural network according to an embodiment of the present invention includes a phase difference computation layer from which phase difference information for each element between a plurality of sets with regard to complex data is output. On the basis of this feature of the neural network according to the embodiment of the present invention, it is possible to improve estimation accuracy with regard to data in which significance is attached to a relative phase.

2. FIRST EMBODIMENT

2.1. Functional Configuration Example of Information Processing Device 10

Next, a first embodiment of the present invention will be described. First, the functional configuration example of the information processing device 10 according to the embodiment will be described. FIG. 1 is an example of a functional block diagram of the information processing device 10 according to the embodiment. With reference to FIG. 1, the information processing device 10 according to the embodiment includes an input unit 110, an estimation unit 120, a storage unit 130, and an output unit 140. Hereinafter, the configuration will be described while focusing on functions of the configuration.

(Input Unit 110)

The input unit 110 has a function of detecting various kinds of operation input by an operator. For example, the input unit 110 according to the embodiment may detect operation input by the operator for designating data to be used by the estimation unit 120 (to be described later) for estimation. Therefore, the input unit 110 according to the embodiment may include various devices configured to detect operation input by an operator. For example, the input unit 110 may be implemented by various kinds of buttons, keyboards, touchscreens, mice, switches, or the like.

(Estimation Unit 120)

The estimation unit 120 has a function of estimating a status on the basis of a machine learning model by using input complex data. In this case, the estimation unit 120 according to the embodiment may estimate the status by using a neural network. For example, it is possible for the estimation unit 120 according to the embodiment to use the neural network and output an answer to a regression problem, a classification problem, or the like. Details of the configuration of the neural network according to the embodiment will be described later.

(Storage Unit 130)

The storage unit 130 has a function of storing programs, data, and the like that are used in respective structural elements included in the information processing device 10. For example, the storage unit 130 according to the embodiment may store various parameters used for the neural network included in the estimation unit 120, an output result output from the estimation unit 120, and the like.

(Output Unit 140)

The output unit 140 has a function of outputting various kinds of information to an operator. For example, the output unit 140 according to the embodiment may output an estimation result estimated by the estimation unit 120. Therefore, the output unit 140 according to the embodiment may include a display device configured to output visual information. For example, the display unit may be implemented by a cathode ray tube (CRT) display device, a liquid crystal display (LCD) device, an organic light emitting diode (OLED) device, a touchscreen, a projector, or the like.

The functional configuration example of the information processing device 10 according to the embodiment has been described above. The above described functional configuration example is a mere example, and the functional configuration example of the information processing device 10 according to the embodiment is not limited thereto. The information processing device 10 according to the embodiment may further include a structural element other than the structural elements illustrated in FIG. 1. For example, the information processing device 10 may further include a communication unit configured to communicate information to another information processing terminal, or the like. The functional configuration of the information processing device 10 according to the embodiment can be flexibly modified.

2.2. Network Configuration Example

Figure 2:
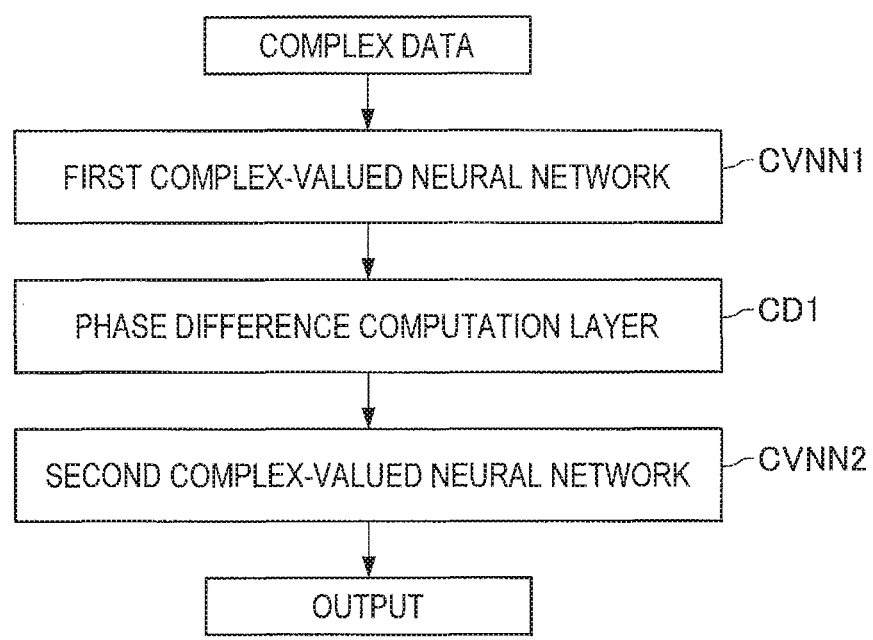
FIG. 2 is a diagram illustrating a network configuration example of a neural network according to the embodiment.

Next, details of the network configuration example of the neural network according to the embodiment will be described. FIG. 2 is a diagram illustrating the network configuration example of the neural network according to the embodiment.

With reference to FIG. 2, the neural network according to the embodiment includes a first complex-valued neural network CVNN1, a phase difference computation layer CD1, and a second complex-valued neural network CVNN2.

Here, as illustrated in FIG. 2, complex data may be input to the first complex-valued neural network CVNN1 according to the embodiment. The first complex-valued neural network CVNN1 performs a computation process on the basis of input complex data, and outputs complex data corresponding to a result of the computation process.

In addition, the phase difference computation layer CD 1 according to the embodiment has a function of calculating phase difference between pieces of complex data. More specifically, it is possible for the phase difference computation layer CD1 according to the embodiment to output phase difference information for each element between a plurality of sets with regard to the complex data.

In addition, the second complex-valued neural network CVNN2 according to the embodiment performs a computation process on the basis of the phase difference information output from the phase difference computation layer CD1, and outputs complex data corresponding to a result of the computation process.

Figure 3:
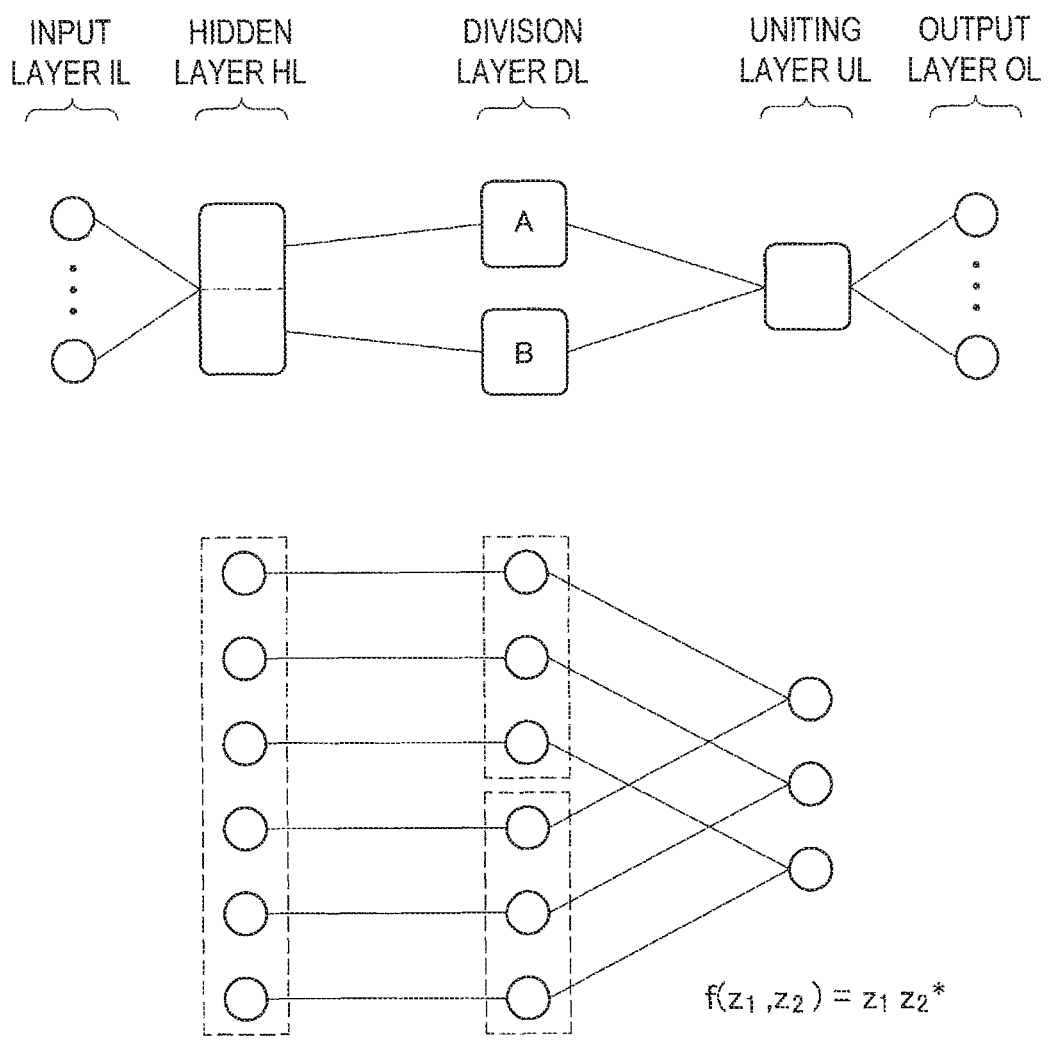
FIG. 3 is a diagram illustrating a configuration of a phase difference computation layer according to the embodiment.

Next, details of the configuration of the phase difference computation layer CD 1 according to the embodiment will be described. FIG. 3 is a diagram illustrating the configuration of the phase difference computation layer CD1 according to the embodiment. With reference to FIG. 3, the phase difference computation layer CD 1 according to the embodiment includes an input layer IL, an hidden layer HL, a division layer DL, a uniting layer UL, and an output layer OL. In the upper side of FIG. 3, an overview of the configuration of the phase difference computation layer is illustrated. In the lower side of FIG. 3, an example of neurons constituting the hidden layer HL, the division layer DL, and the uniting layer UL is illustrated. In FIG. 3, each circle represents a single neuron, and each rectangle having rounded corners represents a set of a plurality of neurons.

First, complex data output from the first complex-valued neural network CVNN1 is input to the input layer IL, and propagates to the hidden layer HL.

Next, in the division layer DL according to the embodiment, a set of neurons constituting the hidden layer HL is divided into two or more sets. In the example illustrated in FIG. 3, six neurons constituting the hidden layer HL are divided into two sets including a set A and a set B in the division layer DL. Each of the set A and the set B includes three neurons. To divide neurons in such a way, the number of neurons constituting the hidden layer HL according to the embodiment may be an even number. By performing the above described process, it is possible to output phase difference for each element between the sets.

In the subsequent uniting layer UL, respective elements are associated on a one-to-one basis between the sets in the division layer DL to calculate phase difference between the elements. At this time, in the case where an element $z_1$ belongs to the set A and an element $z_2$ belongs to the set B in forward direction propagation, it is possible for the uniting layer UL to calculate phase difference between elements by using a function such as the following equation (3) or (4). Note that, a symbol * in the following equation (3) represents a complex conjugate symbol. Accordingly, the phase difference computation layer CD1 according to the embodiment may output phase difference on the basis of a conjugate product of corresponding elements between the sets.

$$f(z_1, z_2) = z_1 z_2^* \tag{3}$$

$$f(z_1, z_2) = z_1 / z_2 \tag{4}$$

Figure 4:
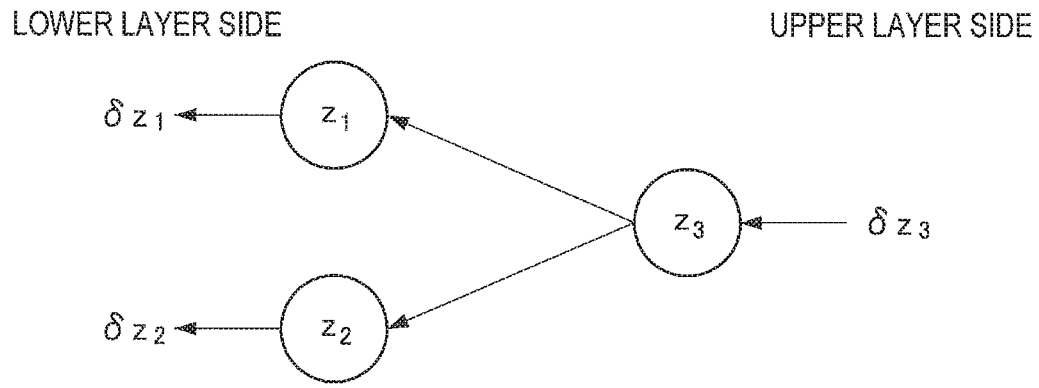
FIG. 4 is a diagram illustrating an example of forward direction propagation according to the embodiment.

Next, backward direction propagation (backward propagation of errors) will be described. FIG. 4 is a diagram illustrating an example of forward direction propagation according to the embodiment. As illustrated in FIG. 4, when the elements $z_1$ and $z_2$ are converted into $z_3$ by using $f(z_1, z_2) = \alpha z_1 z_2^* + \beta = z_3$ (where $\alpha$ and $\beta$ represent actual constants of a scalar) in forward direction propagation and error gradient $\delta z_3$ propagates from an upper layer in backward direction propagation, error gradient $\delta z_1$ and error gradient $\delta z_2$ are represented by the following equations (5) and (6). The error gradient $\delta z_1$ and the error gradient $\delta z_2$ are propagated by respective neurons corresponding to the elements $z_1$ and $z_2$.

$$\delta_{z_1} = \frac{\partial z_3}{\partial z_1} \delta_{z_3} + \left(\frac{\partial z_3}{\partial z_1^*}\right)^* \delta_{z_3}^* = \alpha z_2^* \delta_{z_3}^* \tag{5}$$

$$\delta_{z_2} = \frac{\partial z_3}{\partial z_2} \delta_{z_3} + \left(\frac{\partial z_3}{\partial z_2^*}\right)^* \delta_{z_3}^* = \alpha z_1^* \delta_{z_3}^* \tag{6}$$

As described above, it is possible to perform the phase difference computation process within the complex-valued neural network framework, by propagating the error gradient $z_1$ and the error gradient $z_2$ to the lower layer side in the phase difference computation layer CD1 according to the embodiment.

The configuration example of the neural network according to the embodiment has been described above. Note that, the configuration described with reference to FIG. 2 and FIG. 3 is a mere example, and the configuration of the neural network according to the embodiment is not limited thereto. For example, the neural network according to the embodiment may include three or more complex-valued neural networks. In addition, for example, the phase difference computation layer CD 1 according to the embodiment may include a plurality of the hidden layers HL. In addition, the phase difference computation layer CD1 may include a plurality of sets of the hidden layer HL, the division layer DL, and the uniting layer UL.

In addition, the neural network according to the embodiment may further include a transformation layer configured to transform complex-valued data into real-valued data, and a real-valued neural network configured to perform a computation process on the basis of the real-valued data output from the transformation layer.

Figure 5:
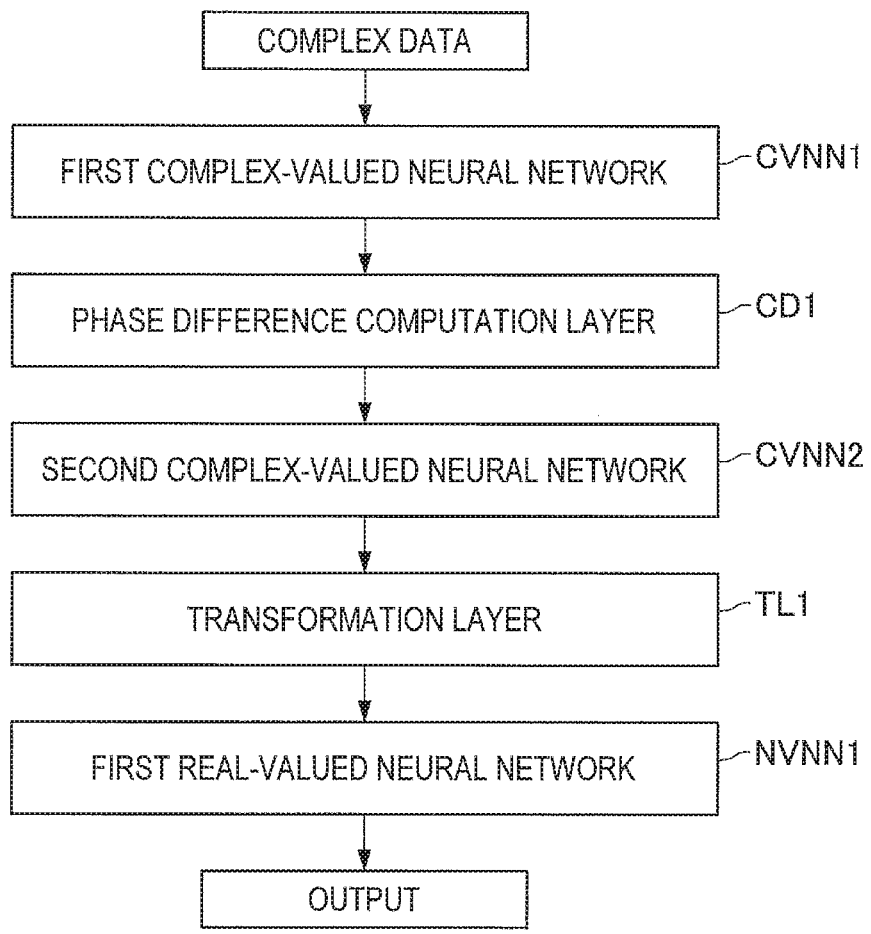
FIG. 5 is a diagram illustrating a network configuration example of a neural network including a transformation layer according to the embodiment.

FIG. 5 is a diagram illustrating a network configuration example of a neural network including the transformation layer according to the embodiment. With reference to FIG. 5, the neural network according to the embodiment may further include a transformation layer TL1 and a first real-valued neural network NVNN1 in addition to the structural elements illustrated in FIG. 2.

Here, in the case where a complex number u represents a result of the phase difference computation, it is possible for the transformation layer TL1 to obtain a complex number z through the following equation (7). In this case, Arg(u) in the equation (7) represents a phase of u. Next, it is possible for the transformation layer TL1 to find a real number neuron (x=|u|) related to amplitude of u and a real number neuron (y=Arg(u)) related to the phase of u, by independently applying the following equation (8) for extracting a real part and the following equation (9) for extracting an imaginary part. In this case, Arg(u) includes a phase difference component between complex-valued neurons through the phase difference computation process. Therefore, it is possible to obtain phase difference as a real number.

$$f_L(u) = \log u = |u| + i\mathrm{Arg}(u) = z \quad (7)$$

$$f_R(z = x + iy) = \frac{1}{2}(z + z^*) = x \quad (8)$$

$$f_I(z = x + iy) = \frac{z - z^*}{2i} = y \quad (9)$$

Details of the configuration of the neural network according to the embodiment have been described above. By using the neural network according to the embodiment, it is possible to automatically decide correlation between all combinations of pieces of input data without calculating phase difference between the combinations in advance, and it is possible to drastically reduce computation cost. In addition, by using the neural network according to the embodiment, it is possible to consider phase correlation between neurons, and it is possible to drastically improve estimation accuracy of the regression problem and the classification problem.

Note that, the case where the input data is complex data has been mainly described. However, it is possible to apply the present technical idea to a hypercomplex-valued neural network. For example, in the quaternion neural network that is one of hypercomplex-valued systems, a single quaternion neuron can be represented as $q=a+bi+cj+dk$. In this equation, i, j, and k may be imaginary units. In this case, it is possible to calculate a product of two quaternion neurons in the quaternion neural network in a way similar to the function $f(z_1,z_2)=z_1 z_2^*$ for calculating phase difference in the complex-valued neural network. Therefore, it is possible to consider phase difference between neurons in the quaternion neural network by using a conjugate quaternion $q^*=a-bi-cj-dk$ and finding a function $f(q_1,q_2)=q_1 q_2^*$.

3. SECOND EMBODIMENT

3.1. Overview of Second Embodiment

Next, the second embodiment of the present invention will be described. It is possible for the neural network according to the second embodiment of the present invention to output a plurality of feature maps by convolving input complex data, and calculate phase difference for each element between the feature maps. In other words, as one of the features, the neural network according to the embodiment is a complex-valued convolutional neural network (complex-valued CNN).

As described above, Non-Patent Literature 1 discloses a complex-valued convolutional neural network obtained by expanding a convolutional neural network constituted by real number neurons. However, according to the configuration described in Non-Patent Literature 1, phase difference between neurons cannot be considered. Therefore, estimation accuracy is expected to be deteriorated with respect to data in which significance is attached to correlation of phases.

Examples of the data in which significance is attached to correlation of phases include a frequency spectrum obtained by applying Fourier transform to signals. Since the frequency spectrum is constituted by a complex number, it is possible to extract amplitude and a phase. However, the phase changes within a range from 0 to $2\pi$ (due to factors such as change in signal amplitude or a timing of cutting out a signal when applying the Fourier transform. Therefore, it is difficult to use the phase as an absolute value for a feature amount of pattern recognition or the like.

Therefore, to use the frequency spectrum as the feature amount, a process of transforming the frequency spectrum to phase difference between adjacent neighborhood frequency bins is necessary, for example. The phase difference obtained in such a wat is a relative value. Therefore, the phase difference can be a feature amount robust to the phase variation.

Figure 6:
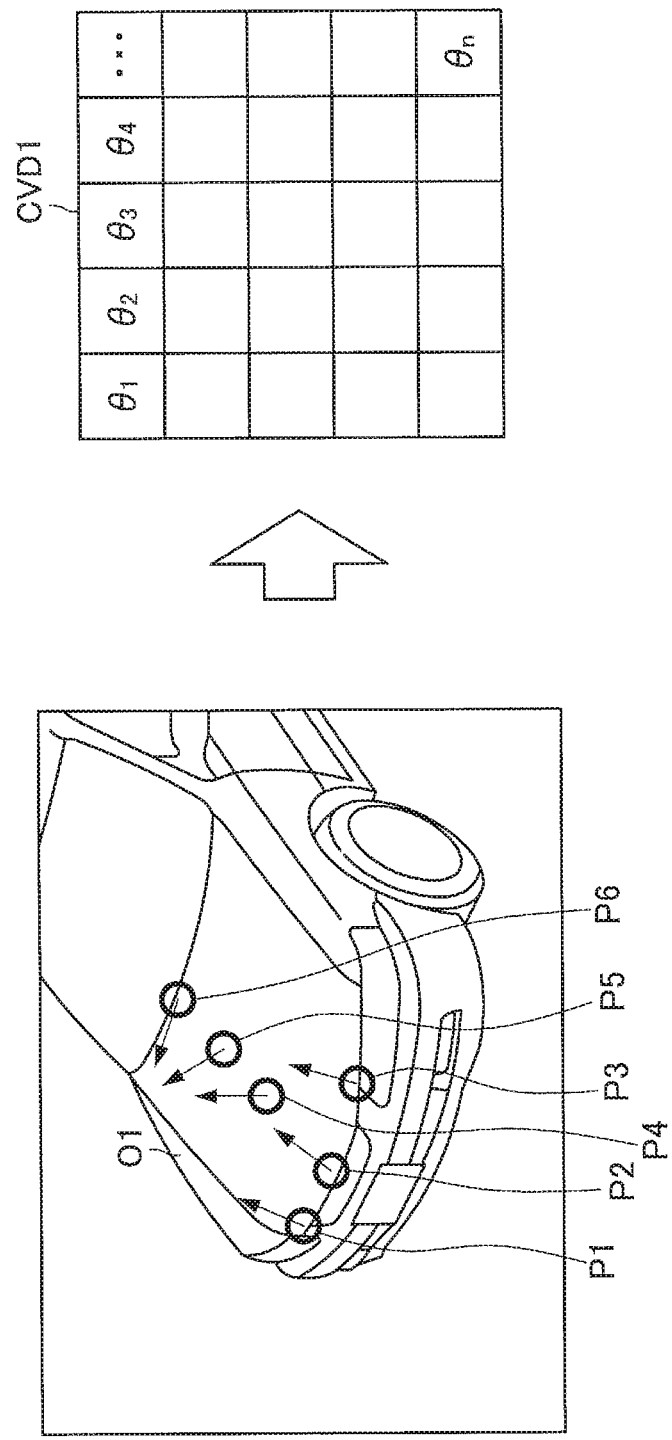
FIG. 6 is a diagram illustrating complex data to be input to a neural network according to a second embodiment of the present invention.

FIG. 6 is a diagram illustrating complex data to be input to the neural network according to the embodiment. The left side of FIG. 6 illustrates an image of phase values P1 to P6 obtained when an object O1 reflects a radio wave emitted by radar. In this case, the phase values P1 to P6 are folded by half wavelength units. Therefore, in the phase values, significance is not attached to absolute values in contrast to the image of the phases illustrated in the drawing. Therefore, estimation accuracy is expected to be deteriorated when such phase values are processed by using the configuration described in Non-Patent Literature 1.

On the other hand, relative relation between phases (in other words, phase differences) is expected to vary depending on the physical shape of the object O1. For example, FIG. 6 illustrates complex data CVD1 obtained from reception signals of the radar. For example, the complex data CVD1 may be data in which intensities of the reception signals are represented by a two-dimensional space constituted by distance and angles. In this case, phases $\theta_1$ to $\theta_n$ are stored in respective cells in the complex data CVD1. However, there are a huge number of combinations of phases to extract phase difference. Therefore, the number of manually made combinations is limited.

When using the neural network according to the embodiment, it is possible to automatically acquire phase combination patterns by using a pair of convolution filters having structures different from each other.

Next, details of the configuration of the neural network having the above described feature according to the embodiment will be described. Note that, in the following, differences from the first embodiment are mainly described, and detailed description about structural elements common to the first embodiment are omitted.

3.2. Network Configuration Example (General Complex-Valued Convolutional Neural Network)

First, to clarify advantages of the neural network according to the embodiment, the general complex-valued neural network will be described. In the general complex-valued convolutional neural network, a convolution process and a pooling process are repeatedly applied in a way similar to the real-valued convolutional neural network, and the general complex-valued convolutional neural network is finally connected with the complex-valued neural network.

Next, the convolution process will be described. For example, when an input feature map h of a complex number having the size of I×J (i=0,1, . . . , I; j=0,1, . . . , J), and a weight w of a complex number having the size of P×Q (p=0,1, . . . , P; q=0,1, . . . , Q), and bias b of a complex number are used in the l-1th layer, a feature map u to be output is represented by the following equation (10). Note that, in the following description, a set of the weight w and the bias b is referred to as a convolution filter.

$$u_{i,j}^{(l)} = \sum_{p=0}^{P-1} \sum_{q=0}^{Q-1} h_{i+p,j+q}^{(l-1)} w_{p,q}^{(l)} b_{i,j}^{(l)} \quad (10)$$

Figure 7:
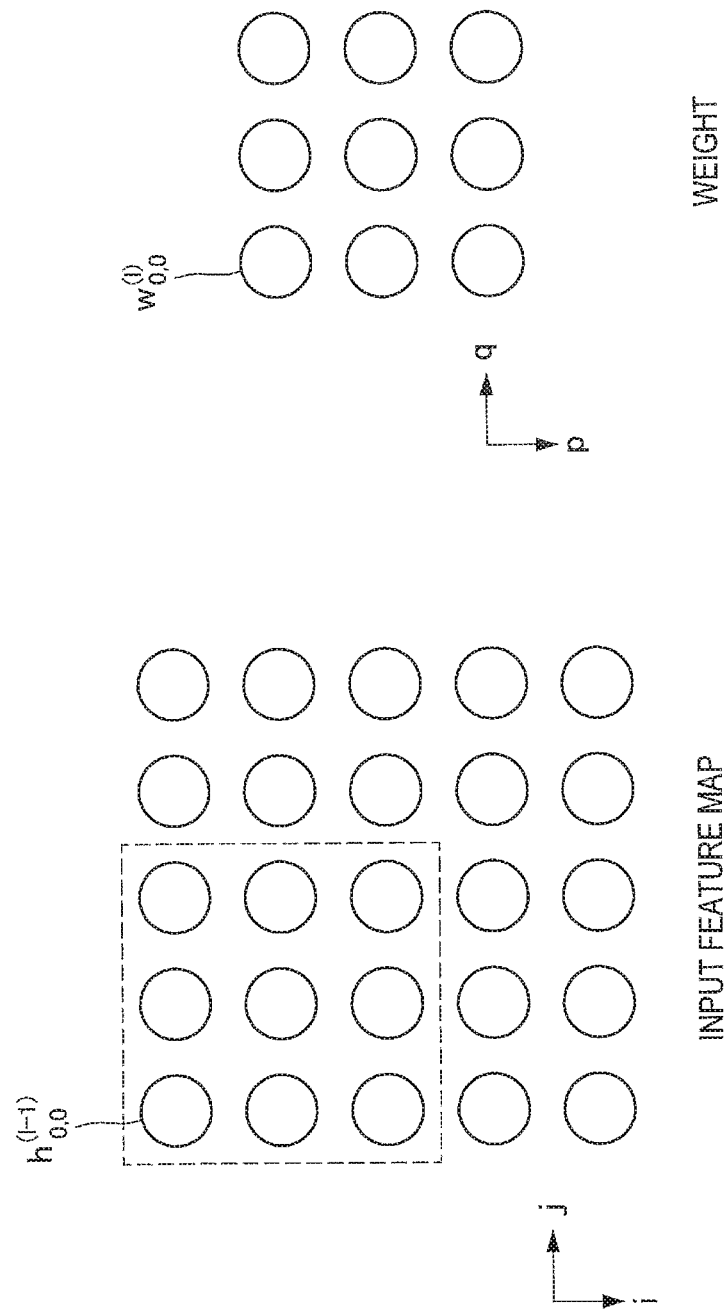
FIG. 7 is a diagram illustrating a convolution process with regard to a general complex-valued convolutional neural network.

More specifically, in the case of (I,J,P,Q)=(5,5,3,3), a result of adding the bias b and a result of summing products of weights and neurons within a dotted frame in the input feature map illustrated in FIG. 7 may become an element of an output feature map u. FIG. 7 is a diagram illustrating the convolution process with regard to the general complex-valued convolutional neural network. In this case, in the general complex-valued convolutional neural network, it is possible to calculate each element of the output feature map u by sliding the dotted frame in FIG. 7 to change a combination of neurons. In addition, it is possible to apply any activating function to the obtained output feature map u.

Here, in general, a plurality of convolution filters are applied to a plurality of input feature maps in a convolution process. Therefore, for example, it is possible to replace the above-described equation (10) with the following equation (11), where K represents the number of the input feature maps h and M represents the number of the convolution filters.

$$u_{i,j,m}^{(l)} = \sum_{k=0}^{K-1} \sum_{p=0}^{P-1} \sum_{q=0}^{Q-1} h_{i+p,j+q,k}^{(l-1)} w_{p,q,m}^{(l)} b_{i,j,m}^{(l)} \quad (11)$$

In this case, the number of the output feature maps u becomes identical to the number of the convolution filters.

Figure 8:
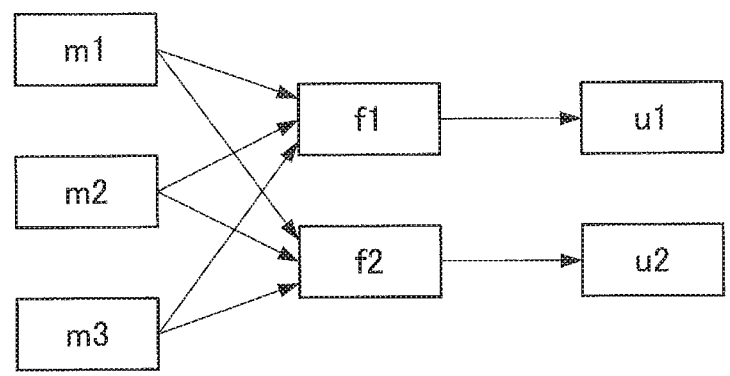
FIG. 8 is a diagram illustrating relation between output feature maps and convolution filters in a general complex-valued convolutional neural network.

FIG. 8 is a diagram illustrating relation between output feature maps and convolution filters in the general complex-valued convolutional neural network. FIG. 8 illustrates three input feature maps m1 to m3, two convolution filters f1 and f2, and two output feature maps u1 and u2. In this case, the output feature map u1 is represented as u1=f1*m1+f1*m2+f1*m3. In addition, the output feature map u2 is represented as u2=f2*m1+f2*m2+f2*m3. Here, the symbol * represents the convolution process.

As described above, in the convolution process, product-sum operation of complex numbers is performed in the convolution filter in the general complex-valued convolutional neural network. As a result of such operation, the obtained output feature map u represents similarity between an input feature map and a convolution filter in a way similar to the case of the real-valued convolutional neural network. In this case, the similarity should be represented by a comparable scale. Therefore, amplitude of the output feature map may be a substantive indicator of the similarity.

In the case of modifying the weight of the complex number such that similarity to a predetermined element gets larger in learning using the complex-valued convolutional neural network, amplitude of the weight is modified such that amplitude of the weight co-occurs with amplitude of the input feature map, and the phase of the weight is modified such that the phase of the weight becomes a result of adding a constant to reverse phase of the input feature map. Note that, a common constant may be used for a single convolution operation. In addition, a reason why the phase of the weight is modified in such a way is because maximum amplitude (in other words, similarity) is obtained when all phases are the same (coordinate phase) when performing addition in the product-sum operation with regard to convolution.

Next, a pooling process in the general complex-valued convolutional neural network will be described. Examples of the pooling process used in the general complex-valued convolutional neural network include maximum amplitude pooling defined by the following equation (12). In the pooling process, an output feature map u that is an output from the convolution process is input, and an input feature map h that is to be input to a convolution process in a next layer is generated. $P_{i,j}$ represents a set of neurons with regard to a U×H region centered on (i,j) to which the pooling process is applied.

$$h_{i,j,m}^{(l)} = \arg\max_{u_{p,q,m} \in P_{i,j}^{(l)}} |u_{p,q,m}^{(l)}| \quad (12)$$

In the maximum amplitude pooling process, it is possible to extract only elements of a feature map corresponding to the maximum value of amplitude of a complex number and ignore change in a position of a target feature amount even in the case where the position changes in the map, and it is possible for the network to acquire invariance with regard to a position of a feature amount.

(Neural Network According to Embodiment)

Next, details of the configuration of the neural network according to the embodiment will be described. As described above, the neural network according to the embodiment is capable of dealing with data in which significance is attached to a relative phase. Therefore, the neural network according to the embodiment may have a function of calculating phase difference for each element between input feature maps in addition to the structural elements included in the general complex-valued convolutional neural network described above.

Figure 9:
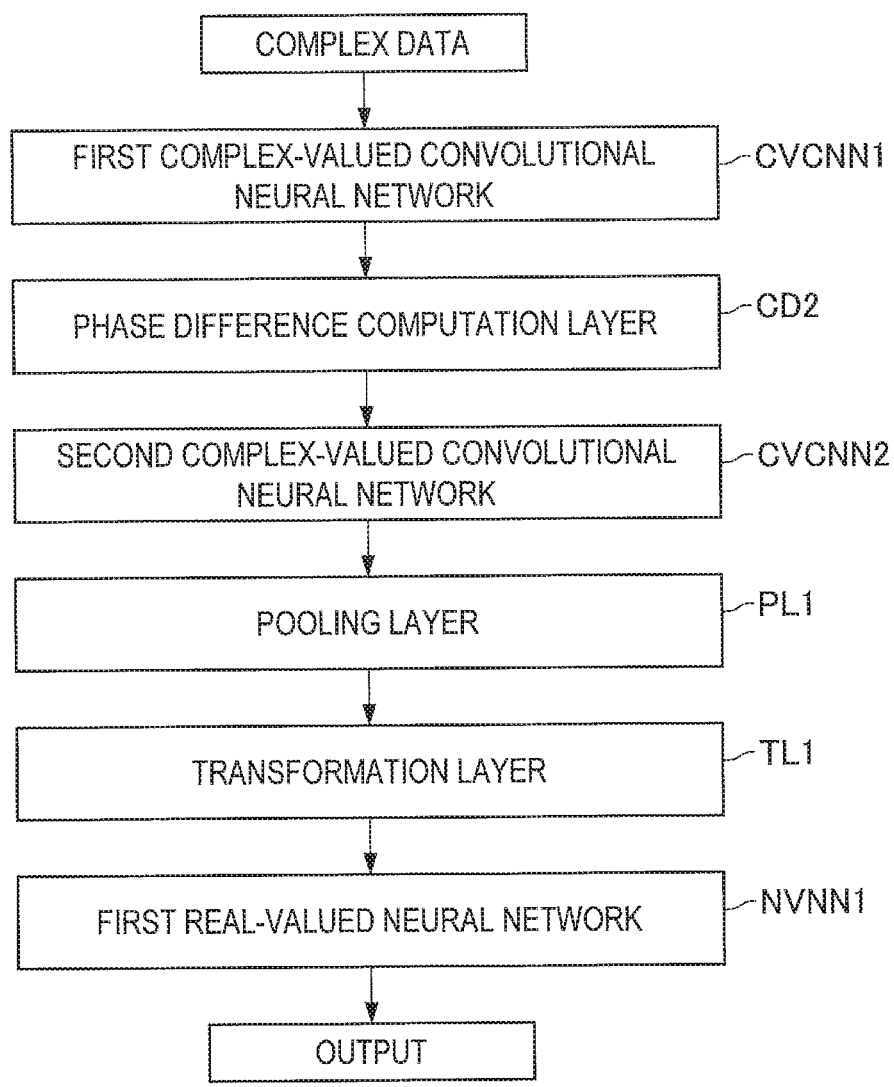
FIG. 9 is a diagram illustrating a network configuration example of a neural network according to the second embodiment of the present invention.

FIG. 9 is a diagram illustrating the network configuration example of the neural network according to the embodiment. With reference to FIG. 9, the neural network according to the embodiment includes a first complex-valued convolutional neural network CVCNN1, a phase difference computation layer CD2, a second complex-valued convolutional neural network CVCNN2, a pooling layer PL1, a transformation layer TL1, and a first real-valued neural network NVNN1.

First, a convolution process performed in the first complex-valued convolutional neural network CVCNN1 according to the embodiment will be described. In the first complex-valued convolutional neural network CVCNN1 according to the present embodiment, it is possible to perform a convolution process on a plurality of input feature maps that have been input. The convolution process uses a pair of convolution filters having structures different from each other.

Figure 10:
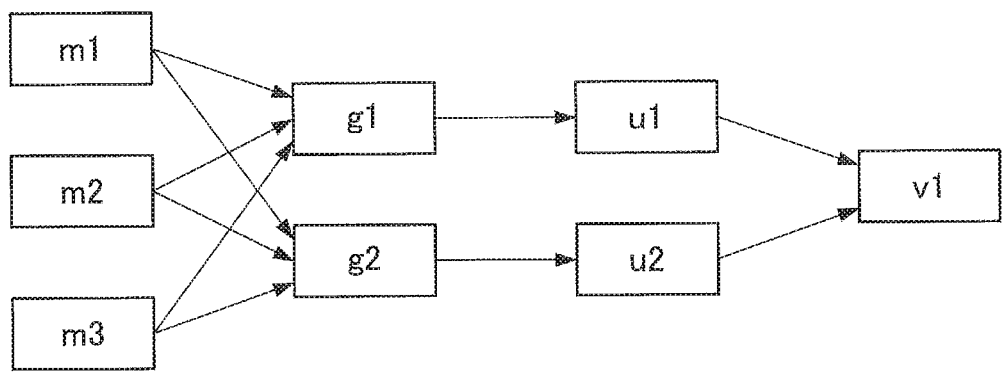
FIG. 10 is a diagram illustrating relation between input feature maps and convolution filters in a convolution process in a neural network according to the embodiment.

FIG. 10 is a diagram illustrating relation between input feature maps and convolution filters in the convolution process in the neural network according to the embodiment. For example, as illustrated in FIG. 10, the first complex-valued convolutional neural network CVCNN1 according to the embodiment can obtain output feature maps u1 and u2 by performing convolution processes on the three input feature map m1 to m3 that have been input. In the convolution processes, a pair of convolution filters g1 and g2 having structures different from each other are used.

In this case, the output feature map u1 is represented by u1=g1*m1+g1*m2*g1*m3. In addition, the output feature map u2 is represented by u2=g2*m1+g2*m2*g2*m3.

More specifically, in the convolution process according to the embodiment, it is possible to find the two output feature maps u1 and u2 by applying the following equation (13). In the following equation (13), P[·] represents the pair of convolution filters (m=0,1).

$$u_{i,j,m}^{(l)} = \sum_{k=0}^{K-1}\sum_{p=0}^{P-1}\sum_{q=0}^{Q-1} h_{i+p,j+q,k}^{(l-1)} P[w_{p,q,m}^{(l)}] \quad (13)$$

However, in this case, a real-valued weighting parameter may be used as a weight related to the convolution filter in contrast to the general complex-valued convolutional neural network. By using a real number as the weighting parameter, it is possible to learn a convolution filter that react only to amplitude of the input feature map, and generates the output feature map having an average phase with regard to the convoluted region. In addition, the convolution process according to the embodiment does not have to include a bias term.

Next, in the phase difference computation layer CD2 according to the embodiment, a function of calculating phase difference for each element of the obtained output feature maps u1 and u2 is applied, and the output feature maps u1 and u2 are united into a single phase difference map v1 as illustrated in FIG. 10. In other words, in a way similar to the phase difference computation layer CD 1 according to the first embodiment, it is possible for the phase difference computation layer CD2 according to the embodiment to output phase difference for each element between a plurality of sets with regard to complex data. In this case, it is possible for the phase difference computation layer CD2 according to the embodiment to unite maps into the phase difference map v1 by applying the above described equations (3) or (4), for example.

For example, it is possible for the phase difference computation layer CD2 to obtain the united phase difference map v1 by applying the equation (3) in a way similar to the following equation (14). Here, the number of the output feature maps u used for the uniting may be an even number. For example, when using the M number of the output feature maps u, it is possible to obtain the M/2 number of the phase difference maps v by applying the following equation (14). Note that, an overline represents complex conjugate.

$$v_{i,j,m}^{(l)} = f(u_{i,j,m}^{(l)}, u_{i,j,m+1}^{(l)}) = u_{i,j,m}^{(l)}\overline{(u_{i,j,m+1}^{(l)})} \quad (14)$$

Note that, in this case, as described above, the obtained phase difference map v includes phase difference for each element of the two output feature maps u1 and u2 extracted by using the pair of convolution filters having structures different from each other.

Figure 11:
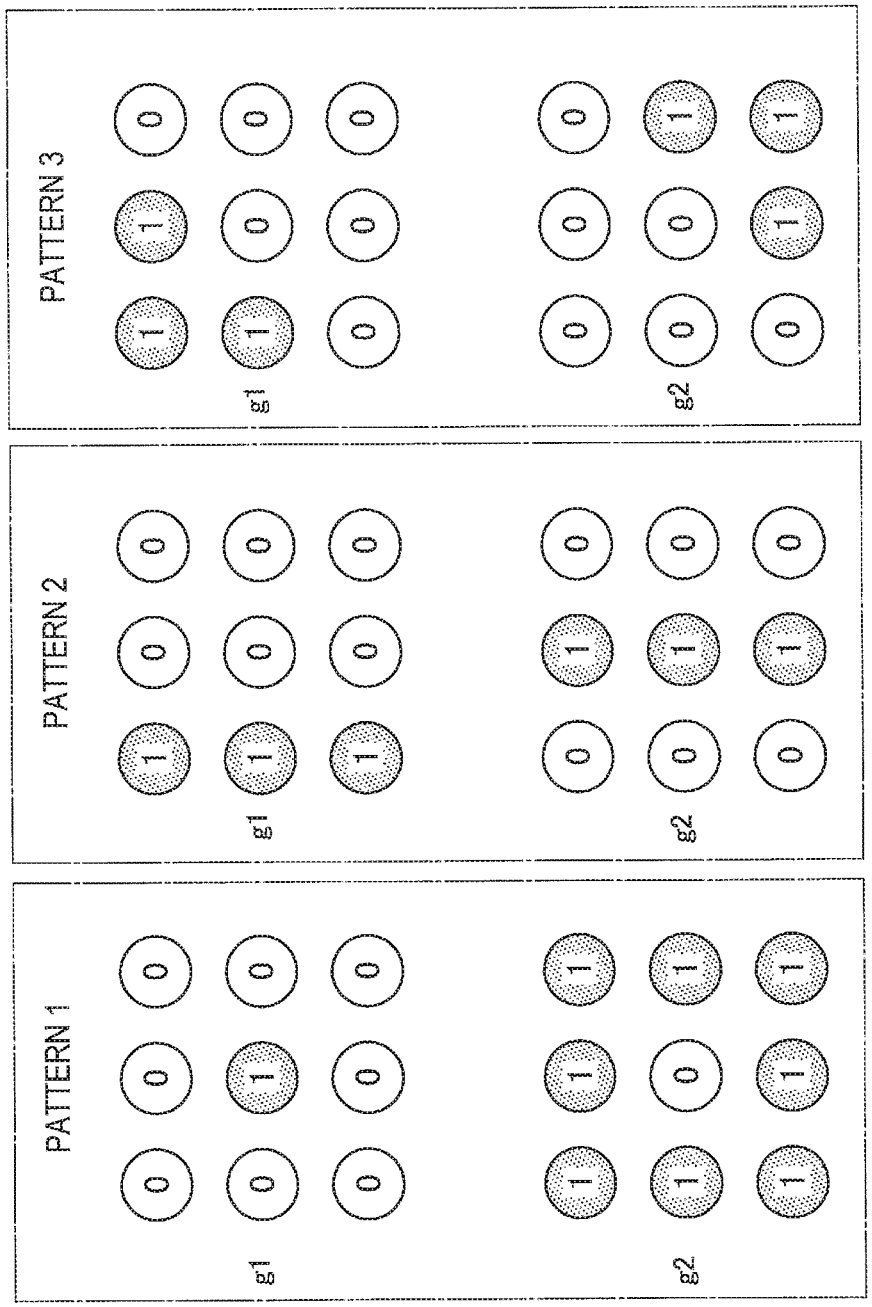
FIG. 11 is a diagram illustrating pairs of convolution filters having structures different from each other according to the embodiment.

FIG. 11 is a diagram illustrating pairs of convolution filters having structures different from each other according to the embodiment. FIG. 11 illustrates of patterns 1 to 3 of a pair of convolution filters g1 and g2 having structures different from each other, as an example. As described above, the pair of convolution filters g1 and g2 according to embodiment may include weighting parameters that are real numbers. In the case where complex numbers are used as the weighting parameters, constant terms that vary depending on initial values of the weights appear in phases of the obtained output feature maps u1 and u2. However, such an indefinite constant term may become a cause of an error in the case of applying a function of calculating phase difference. According to the embodiment, it is possible to eliminate the cause of the error by using the weighting parameter that is the real number.

Note that, to simplify the description, FIG. 11 illustrates an example in which each of convolution filters g1 and g2 in a pair has a size of 3×3, and they have weighting parameters of 0 or 1. However, the weighting parameters according to embodiment are not limited thereto.

For example, the pair of convolution filters g1 and g2 having structures different from each other according to the embodiment may extract an average phase of the center and an average phase around the center, as illustrated in the pattern 1 in FIG. 11. In addition, as illustrated in pattern 2, the pair of convolution filters g1 and g2 may extract an average phase of a left column and an average phase of a central column, for example. In addition, as illustrated in pattern 3, the pair of convolution filters g1 and g2 may extract an average phase of an upper left corner and an average phase of a lower right corner, for example.

As described above, by using the pair of convolution filters g1 and g2 according to the embodiment, it is possible to extract data characterized in that a predetermined phase is different from a surrounding phase in an input feature map (in other words, a feature that is effective to data in which significance is attached to correlation of phases), for example. In addition, by using the neural network according to the present embodiment, it is possible to automatically decide a pattern of a more effective pair of convolution filters by training a model.

According to the embodiment, it is possible to build a network effective to data in which significance is attached to correlation of phases, by using the phase difference map v obtained in such a way as an input feature map of the second complex-valued convolutional neural network CVCNN2.

In addition, in a way similar to the first embodiment, the neural network according to the embodiment may further include the transformation layer TL1 and the first real-valued neural network NVNN1. As described above, in the transformation layer TL1 according to the embodiment, it is possible to transform a piece of complex data into two pieces of real data, and it is possible to obtain phase difference as a real number. Note that, for example, the first real-valued neural network NVNN1 according to the embodiment may be constituted by a full connected layer, a softmax function, or the like.

4. HARDWARE CONFIGURATION EXAMPLE

Figure 12:
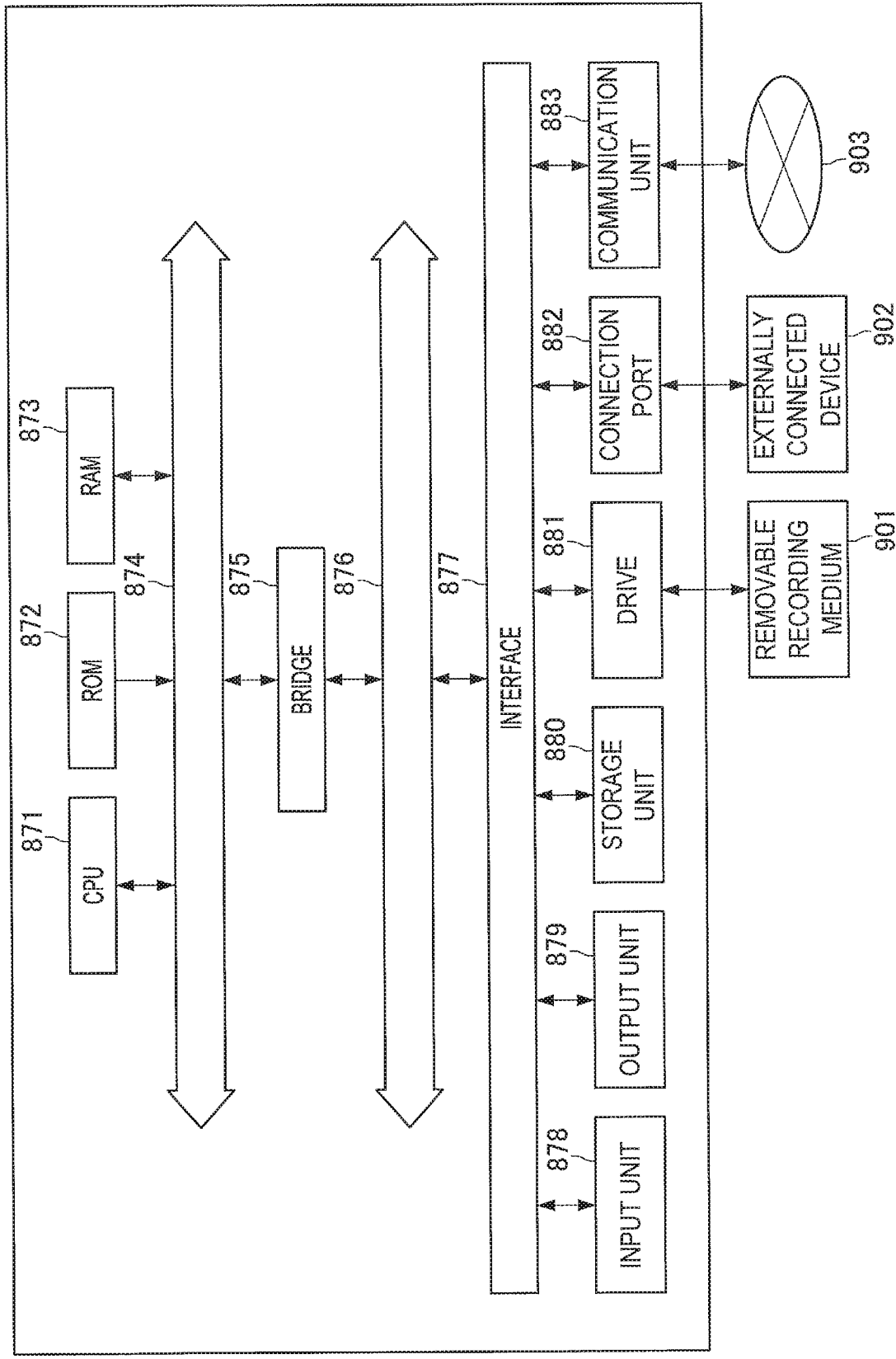
FIG. 12 is a hardware configuration example of an information processing device according to an embodiment of the present invention.

Next, a hardware configuration example of the information processing device 10 according to an embodiment of the present invention will be described. FIG. 12 is a block diagram illustrating the hardware configuration example of the information processing device 10 according to the present embodiment of the present invention. With reference to FIG. 12, for example, the information processing device 10 includes a CPU 871, a ROM 872, a RAM 873, a host bus 874, a bridge 875, an external bus 876, an interface 877, an input unit 878, an output unit 879, a storage unit 880, a drive 881, a connection port 882, and a communication unit 883. The hardware configuration illustrated here is an example. Some of the structural elements may be omitted. A structural element other than the structural elements illustrated here may be further added.

(CPU 871)

The CPU 871 functions as an arithmetic processing device or a control device, for example, and controls entire operation or a part of the operation of each structural element on the basis of various programs recorded on the ROM 872, the RAM 873, the storage unit 880, or a removable recording medium 901.

(ROM 872 and RAM 873)

The ROM 872 is a mechanism for storing, for example, a program to be loaded on the CPU 871 or data or the like used in an arithmetic operation. The RAM 873 temporarily or permanently stores, for example, a program to be loaded on the CPU 871 or various parameters or the like that arbitrarily changes in execution of the program.

(Host Bus 874, Bridge 875, External Bus 876, and Interface 877)

The CPU 871, the ROM 872, and the RAM 873 are interconnected with each other, for example, via the host bus 874 capable of high-speed data transmission. On the other hand, the host bus 874 is connected, for example, via the bridge 875, to the external bus 876 in which a data transmission speed is comparatively low. In addition, the external bus 876 is connected with various structural elements via the interface 877.

(Input Unit 878)

For example, as the input unit 878, a mouse, a keyboard, a touchscreen, a button, a switch, a microphone, a lever, or the like is used. As the input unit 878, a remote controller (hereinafter, referred to as a remote) capable of transmitting a control signal by using infrared or other radio waves is sometimes used.

(Output Unit 879)

The output unit 879 is, for example, a display device such as a cathode ray tube (CRT), an LCD, or an organic EL, an audio output device such as a speaker or headphones, a printer, a mobile phone, or a facsimile, that can visually or audibly notify a user of acquired information.

(Storage Unit 880)

The storage unit 880 is a device for storing therein various types of data. As the storage unit 880, for example, a magnetic storage device such as a hard disk drive (HDD), a semiconductor storage device, an optical storage device, or a magneto-optical storage device is used.

(Drive 881)

The drive 881 is a device for reading information recorded on the removable recording medium 901 and writing information to the removable recording medium 901. The removable storage medium 901 is, for example, a magnetic disk, an optical disk, a magneto-optical disk, or a semiconductor memory.

(Removable Recording Medium 901)

The removable recording medium 901 is, for example, a DVD medium, a Blu-ray (registered trademark) medium, an HD-DVD medium, various types of semiconductor storage media, or the like. Of course, the removable recording medium 901 may be, for example, an electronic device or an IC card on which a non-contact IC chip is mounted.

(Connection Port 882)

The connection port 882 is, for example, a port for connecting an externally connected device 902 such as a Universal Serial Bus (USB) port, an IEEE934 port, a Small Computer System Interface (SCSI), an RS-232C port, or an optical audio terminal.

(Externally Connected Device 902)

The externally connected device 902 is, for example, a printer, a portable music player, a digital camera, a digital video camera, an IC recorder, or the like.

(Communication Unit 883)

The communication unit 883 is a communication device used for connection to a network 903. The communication unit 883 may be, for example, a communication card for a wired or wireless LAN, Bluetooth (registered trademark) or a wireless USB (WUSB), a rooter for optical communication, a rooter for an asymmetric digital subscriber line (ADSL), or a modem for various communication. The communication unit 883 may be connected with a telephone network such as an extension telephone line network or a mobile-phone service provider network.

5. CONCLUSION

As described above, the information processing device 10 according to an embodiment of the present invention has a function of estimating a status by using a complex-valued neural network. As one of the features, the complex-valued neural network includes a phase difference computation layer from which phase difference for each element between a plurality of sets with regard to complex data is output. In accordance with the above described configuration, it is possible to improve estimation accuracy with regard to data in which significance is attached to a relative phase.

The preferred embodiment(s) of the present invention has/have been described above with reference to the accompanying drawings, whilst the present invention is not limited to the above examples. A person skilled in the art may find various alterations and modifications within the scope of the appended claims, and it should be understood that they will naturally come under the technical scope of the present invention.

What is claimed is:

1. An information processing device, comprising:
   a processor; and
   a non-transitory storage medium containing program instructions stored thereon, execution of which by the computing device causes the information processing device to provide functions of:
an estimation unit configured to estimate a status by using a neural network,
wherein the neural network includes
a first complex-valued neural network to which complex data is input,
a phase difference computation layer to which an output of the first complex-valued neural network is input, the phase difference computation layer including a plurality of sets of complex-valued neurons within a same layer, and being configured to calculate a phase difference between any two of the plurality of sets, and
a second complex-valued neural network from which complex data is output on the basis of the phase difference.

2. The information processing device according to claim 1, wherein
the complex-valued neurons in one of said any two of the plurality of sets respectively correspond to the complex-valued neurons in the other of said any two of the plurality of sets; and
the phase difference computation layer outputs the phase difference on the basis of a conjugate product of corresponding complex-valued neurons between the sets.

3. The information processing device according to claim 1,
wherein the phase difference computation layer divides complex-valued neurons belonging to the same layer into at least two or more groups to thereby obtain the plurality of sets.

4. The information processing device according to claim 1, wherein the first complex-valued neural network is a complex-valued convolutional neural network.

5. The information processing device according to claim 4, wherein the complex-valued convolutional neural network performs a convolution process by using a pair of convolution filters having structures different from each other.

6. The information processing device according to claim 5, wherein the convolution filter has a real-valued weight.

7. The information processing device according to claim 1, wherein the neural network further includes a transformation layer configured to transform complex-valued data output from the second complex-valued neural network into real-valued data.

8. An information processing method for an information processing device that includes
a processor, and
a non-transitory storage medium containing program instructions stored thereon, execution of which by the computing device causes the information processing device to provide functions of an estimation unit configured to estimate a status by using a neural network having a first complex-valued neural network, a phase difference computation layer and a second complex-valued neural network,
the method comprising:
inputting, by the processor, complex data to the first complex-valued neural network;
inputting, by the processor, an output of the first complex-valued neural network to the phase difference computation layer that includes a plurality of sets of complex-valued neurons within a same layer;
outputting, by the processor, from the phase difference computation layer, a phase difference between any two of the plurality of sets; and
outputting, by the processor, from the second complex-valued neural network, complex data on the basis of the phase difference.

* * * * *